United States Patent [19]

Simonett

[11] Patent Number: 5,217,149
[45] Date of Patent: Jun. 8, 1993

[54] ARTICLE CARRIER RACK

[76] Inventor: Bernard T. Simonett, P.O. Box 2177, Vail, Colo. 81658

[21] Appl. No.: 509,403

[22] Filed: Apr. 16, 1990

Related U.S. Application Data

[63] Continuation-in-part of Ser. No. 340,803, Apr. 20, 1989.

[51] Int. Cl.⁵ .............................................. B62J 7/00
[52] U.S. Cl. .......................................... 224/40; 224/39
[58] Field of Search ............. 224/39, 40, 42.34, 42.35, 224/42, 37, 38, 32 A, 32 R, 211/195; 403/104; 269/45, 71, 74, 76, 77, 78

[56] References Cited

U.S. PATENT DOCUMENTS

| 328,467 | 10/1885 | Crane | 269/45 |
|---|---|---|---|
| 459,637 | 9/1891 | Lee | 269/45 |
| 658,429 | 9/1900 | Dembinski | 224/40 |
| 702,292 | 6/1902 | Edmonds | 224/39 |
| 837,642 | 12/1906 | Powell | 403/104 |
| 2,019,789 | 11/1935 | Mahannah | 269/71 |
| 2,391,945 | 1/1946 | Christenson | 224/40 |
| 2,717,162 | 9/1955 | Walters | 403/104 |
| 2,776,790 | 1/1957 | Zbikowski . | |
| 4,253,649 | 3/1981 | Hewson | 269/45 |
| 4,258,870 | 3/1981 | Edelson | 224/32 A |
| 4,562,944 | 1/1986 | Jackson et al. | 224/39 |

FOREIGN PATENT DOCUMENTS

| 0184071 | 12/1955 | Fed. Rep. of Germany | 224/38 |
|---|---|---|---|
| 955200 | 12/1956 | Fed. Rep. of Germany | 224/39 |
| 2834439 | 2/1980 | Fed. Rep. of Germany | 224/32 A |
| 369441 | 3/1939 | Italy | 224/41 |
| 243499 | 7/1946 | Switzerland | 224/32 R |
| 316315 | 11/1956 | Switzerland | 224/39 |
| 018996 | of 1897 | United Kingdom | 224/40 |
| 25817 | of 1897 | United Kingdom | 224/40 |
| 462138 | 3/1937 | United Kingdom . | |
| 2168659 | 12/1984 | United Kingdom . | |

Primary Examiner—Linda J. Sholl
Attorney, Agent, or Firm—Paul M. Craig, Jr.

[57] ABSTRACT

An attachment for a load carrier, such as a bicycle rack which permits the user to adapt the same to the changes in the configuration of the load, and which includes two pairs of tubular members extending generally transversely to the carrier and generally L-shaped tubular support arms telescopically associated with a corresponding tubular member, whereby the support arms extend in opposite directions from the free ends of the corresponding pair of tubular members; the support arms which are angularly displaceable and extensible relative to the corresponding tubular members can be locked against axial movements so as to be held in their selected position; each pair of tubular members is thereby fastened to a frame member of the load carrier. In a particularly preferred embodiment, the free end of each support arm terminates in a generally U-shaped support hook whereby each L-shaped support arm with its support hook is arranged in substantially the same plane.

34 Claims, 6 Drawing Sheets

ARTICLE CARRIER RACK

FIELD OF THE INVENTION

This application is a continuation-in-part application of U.S. Ser. No. 07/340,803, filed on Apr. 20, 1989 and entitled "Article Carrier Rack."

This invention relates to new and useful improvements in attachments to load-carrying racks for vehicles and to load-carrying racks incorporating the present invention. When appropriately attached to or incorporated in the load-carrying rack affixed to a vehicle, such as a bicycle or motorcycle, the utility of the vehicle is substantially enhanced by the present invention. It should be understood from the outset that although the ensuing description is directed primarily toward the application of my invention to light-weight vehicles such as bicycles and motorcycles, its advantages are in no way limited to the particular device to which it may be attached. The application to bicycle racks is concentrated on because they are notoriously poor in their ability to easily carry loads of varying bulk and dimensions. Thus, my expandable light-weight rack greatly improves the load-carrying ability of such a vehicle by permitting an adaptation of the configuration of the load-carrying device to the configuration and dimensions of the load to be carried. Just how this is done will be fully described hereinafter. For now, the expandable feature is mentioned to assist in adequately portraying the scope and therefore the many potential fields of this invention. The list of possible uses for this invention is virtually endless. The numerous types of loads capable of being carried by the attachment in accordance with this invention make the same capable of application to nearly any field of endeavor where it is desired to transport or secure in place items whose size and volume may vary across a wide range from load to load.

A few examples of items easily carried with this invention are: wicker baskets, backpacks, bulky grocery bags, briefcases, tool boxes, skis, surfboards, any large flat-based object that needs a wide support for stability, and a myriad of other items too numerous to mention specifically.

As has been stated, this invention is attachable to any vehicle or relatively fixed frame, thus making it applicable to a large number of industries, such as, transportation, manufacturing, warehousing, building and recreation. The majority of this specification will describe in detail a preferred application of the invention in the recreational industry. That application involves the attachment of the rack to a light-weight recreational bicycle dramatically and conveniently improving its load-carrying capacity. However, it is to be understood that the scope of this invention is not limited to the particular embodiment described herein, but is susceptible of numerous other applications, limited only by the scope of the attached claims.

BACKGROUND OF THE INVENTION

Various types of bicycle carrier racks and carrier devices are known in the prior art as disclosed, for example, in U.S. Pat. Nos. 2,537,441; 3,301,448; 3,779,435; 3,837,545; 3,910,471; 3934,770; 4,258,870; 4,266,702; 4,349,138; 4,350,361 and 4,562,944. It is a well-recognized axiom that the reduction of weight of all elements of such a vehicle is of primary importance. Ease of attachment of the carrier to the vehicle has also received considerable attention heretofore. With these two goals in mind, the prior art seems to have missed a very important point, namely, how does the load fit to the carrier? For example, "basket"-type carriers have been known for nearly as long as bicycles. However, such "basket"-type carriers are limited in their usefulness if the load does not fit in the basket. It is also known in the art to provide saddle bag carriers for motorcycles and the like. However, such saddle bag carriers are of little use if the given load does not fit in the bag.

The load-carrying capability of light-weight vehicles, such as bicycles was not utilizable to its fullest extent by existing prior art devices. For example, the distance from one end to the other of many prior carrier racks fixes the maximum size of the load that can be carried. Similarly, the fixed width of the prior carriers limits the width of an object that can be stably carried upon them.

It can be seen that present article carriers suffer from many disadvantages. My invention, particularly applicable to bicycles, overcomes all the previously mentioned disadvantages by providing a significantly improved adjustable load-carrying capability while maintaining as good or better a strength-to-weight ratio and ease of attachment as any other known system.

SUMMARY OF THE INVENTION

A major object of this invention is to provide means to quickly, easily, securely and safely carry any object or group of objects without regard to their varying sizes, weights, or dimensions. Another object is to provide means for easily adjusting the actual shape and size of the carrier to adapt it to the shape and size of each object or group of objects to be carried. A still further object is to make these adjustments in such a way that a strong, rigid and stable base and/or containment is created for any size load. A more specific object is to substantially reduce or eliminate entirely delays and damage caused by present systems when the load shifts or falls from the carrier. Another specific object is to free the user from the frustrating and exasperating task of wrestling with and tying down a load which simply does not fit the carrier. The present invention thus allows users of the bicycles to enjoy the ride without constant apprehension that carried-along objects may fall off the carrier.

It will be seen from the following detailed description that the present invention meets or exceeds all the above goals. Briefly, four easily rotatable and extendable L-shaped arms are provided on a carrier rack to accommodate the load. In addition the remote ends of each of the arms is formed with a hook which can support the load directly or accommodate extensible "shock" cords should they be necessary to additionally secure the load.

By utilizing light-weight aluminum rods for the arms and aluminum tubular members for the arm mounts, simplicity, precision, light weight, strength, ease of manufacture, corrosion resistance and low cost are assured. Additionally, the aluminum parts can be readily anodized to any desired color, preferably black, for pleasing, non-blinding appearance.

This invention, through the placement and orientation of the special support arms, allows load attachment to be carried out with greater speed and accuracy than possible heretofore. As proven principles of geometry and mechanics are used in connection with the various parts of this invention, a predictable stability and rigidity is always assured. The exclusive use of non-corrosive materials such as aluminum also guarantees a long life.

This invention additionally utilizes unique adaptations of otherwise conventional internally tapered flange nuts to achieve simultaneous locking of the desired axial extension and angular displacement of the support arms in accordance with the present invention.

In order to minimize manufacturing costs, for example, in connection with cutting threads and permit relatively inexpensive mass production, plastic end members, for example, injection-molded end members, are used in another embodiment of the present invention which hold the tubular members in predetermined, preferably parallel position and permit use of only standard threaded parts such as screws, bolts, nuts, etc. to tighten the support arms in their desired position. The end members may thereby also be formed with a support-arm-receiving extension having a split tapering thread for use with a tapered locking nut.

According to still another feature of the present invention, the two tubular members may be formed as an integral extruded part so as to eliminate the need for welding the same together.

While the present invention primarily contemplates an attachment to existing bicycle racks and the like, the present invention can also be attached to or incorporated into such a rack at the place of manufacture of the latter. If the attachment according to the present invention is incorporated into the carrier rack, two pairs of tubular members in accordance with the present invention may replace the welded-in cross bars normally found in such types of racks.

BRIEF DESCRIPTION OF THE DRAWINGS

These and other objects, features, and attendant advantages of the present invention will become more apparent from the following description when taken in conjunction with the accompanying drawings, which show, for purposes of illustration only, several embodiments in accordance with the present invention, and wherein.

DETAILED DESCRIPTION OF THE DRAWINGS

Figure 1:
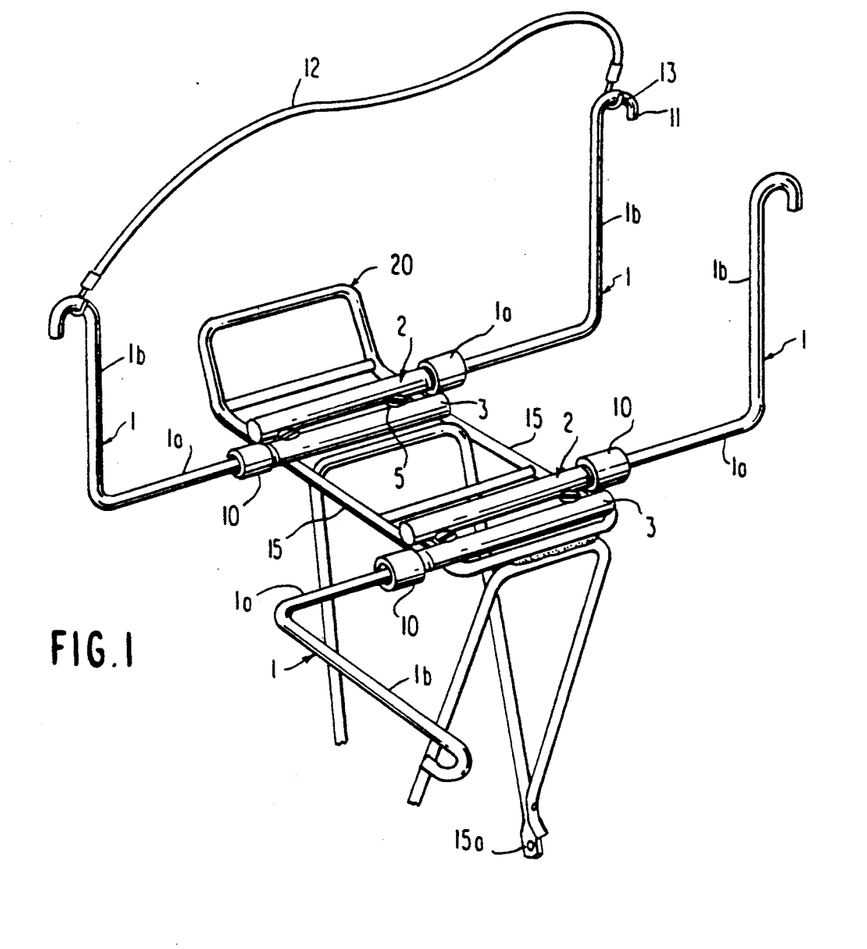
FIG. 1 is a perspective view of a carrier attachment according to the present invention, showing three of the four support arms in the up position and one support arm in the horizontal position.

Referring now to the drawing, wherein like reference numerals are used in the various figures to designate like parts, and more particularly to FIG. 1, there is shown a rear bicycle carrier assembly generally designated by reference numeral 20. The carrier assembly 20, which may be of any known type, is mounted in a conventional manner as at 15a to the bicycle or other support vehicle. The details of this connection to the support vehicle form no part of this invention. The two parallel horizontal longitudinally extending side bars 15 of the carrier assembly 20 are used to mount two cross tube assemblies generally designated by reference numeral 2 of my invention atop and perpendicular to the side bars 15. This rigid mounting is accomplished by means of screws 5 which form part of an overall mounting assembly fully shown and described in conjunction with FIG. 3. Each cross tube assembly 2 consists of two rigidly joined parallel hollow tubular members 3 in the form of cross tubes (FIGS. 1-3) which will be more fully described in conjunction with FIG. 2. Slip fit inside each hollow tubular member 3 is a straight leg 1a of a generally L-shaped support arm 1 of a cross section complementary to the cross section of the corresponding tubular member 3. In a preferred embodiment, the tubular members 3 and support arms 1 are of circular cross section to enable angular displacement by rotary movement of the support arms 1 in the tubular members 3. However, a square cross section would be adequate if only the noon, 3 o'clock, 6 o'clock and 9 o'clock positions are desired for the support arms 1. The fit is such that each straight leg is easily angularly displaceable, preferable rotatable, in and axially extensible with respect to its respective tubular member 3 yet is firmly supported within that tubular member. The other leg 1b of each generally L-shaped support arm 1 is not straight but rather formed with a U-shaped hook 11 bent so that the overall arm 1 is coplanar and the hooks are formed in a direction away from the other (straight) leg 1b of the L. The net result is that the hooks face upward if the support arm 1 is rotated so that the L is turned downward and the hooks face down if the support arm 1 is rotated up.

The hooks 11 are thus formed so as to not interfere with a box-like load placed between the upwardly rotated arms. By the same token when the arms 1 are turned downward, the hooks 11 may actually be used to support the bottom edge of a flat sheet-like object such as a pane of glass or piece of plywood. One skilled in the art will recognize that this method of supporting a sheet-like object on its edge will lower its center of gravity to the lowest possible point, thus promoting the overall stability of the vehicle and its load. Also of primary importance is the fact that the support arms 1 may slide in and out of the cross tubes 3 as well as may be angularly displaced with respect thereto. It will be noted that if a box or the like is too wide to be fit between the upwardly turned support arms 1, all that need be done is to extend the support arms in their respective cross tubes until they form a cavity of sufficient width for the item. The independent extensibility of each of the support arms 1 also allows the sideways shifting of the load to some extent before it is secured by locking the support arms. This allows the center of gravity of the load to be placed directly above the rear or front wheel of the bicycle which in turn greatly enhances the stability.

The independent extensibility is also extremely useful in securing an irregularly shaped object such as a duffel bag or a backpack. The object is placed atop the cross tubes 3 so as to balance from side to side with the support arms loosened. Then each arm 1 is individually snuggled up against whatever portion of the bag happens to be nearby and locked in position. The result is a custom carrier that performs in every way as though it were designed specifically to carry that particular irregularly shaped item. If the item happens to be too tall to be adequately supported on its sides by the upwardly turned support arms 1 and its bottom by the cross tube assemblies 2 and their supporting carrier elements, the U-shaped hooks 11 may be used to easily attach additional stretchable cords 12 with complementary hooks 13 up one side over the top and down the other side. Another awkward case may occur if the item is too wide to fit between the support arms 1 in their maximum extended position. The solution in this case is to rotate the support arms 1 to their horizontal position to provide the maximum possible base support area. Then the cords 12 may be strung out, up, over, down and back around the load. This still provides a very stable support because the horizontal support arms provide an extremely large support base.

Figure 2:
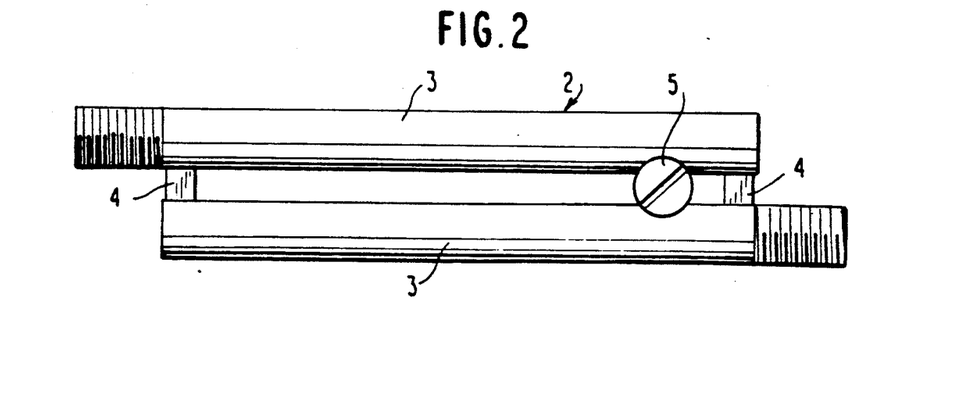
FIG. 2 is a top plan view of one of the two tubular member assemblies used in the invention of FIG. 1.

FIG. 2 shows the details of how a cross tube assembly 2 is formed from two identical cross tubes 3. Each tube 3 is externally threaded on its outwardly extending end, and two such tubes are rigidly joined together by means of welds as shown at 4. The fastening may also be done with commercial adhesives or any other known means that provides a strong, secure, rigid attachment of one tubular member 3 to the other. The cross tubes 3 are joined so that they are preferably parallel to one another and their threaded ends face in opposite directions. Preferably a gap is left between the tubes of sufficient width to allow clearance for an attaching screw 5.

Figures 3, 4:
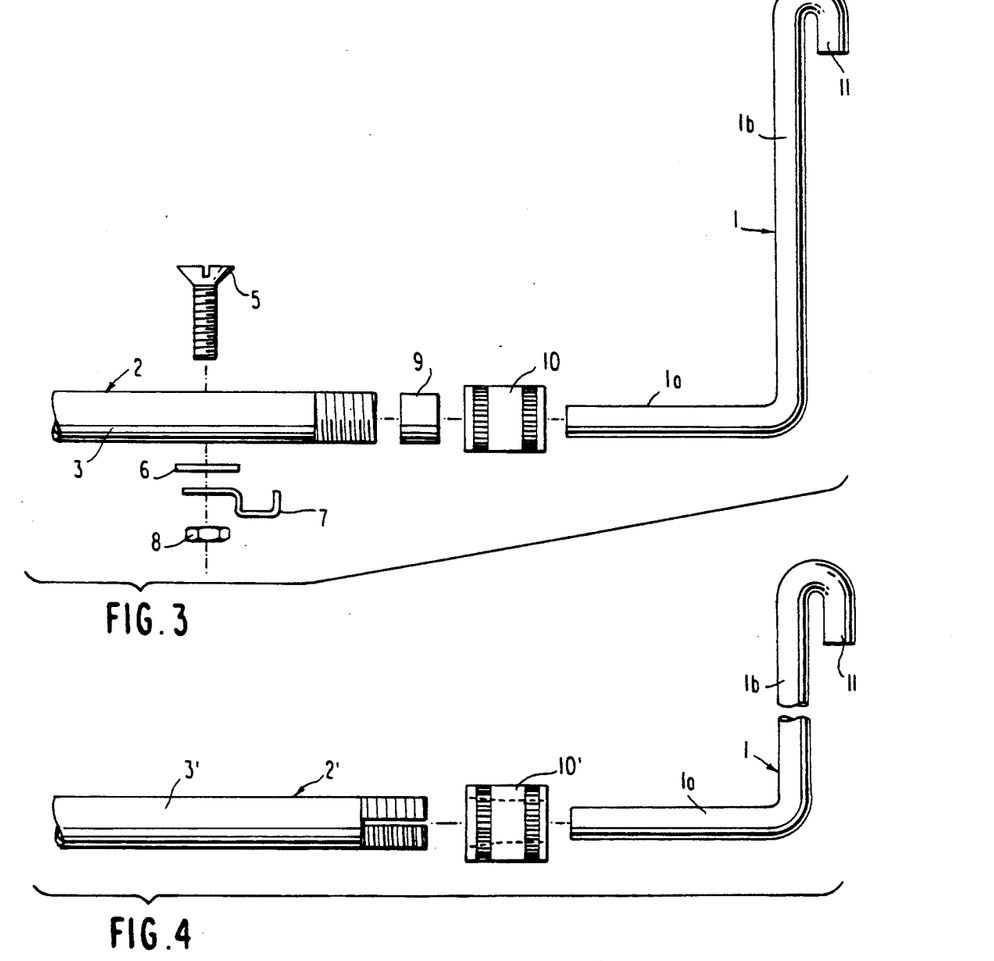
FIG. 3 is an exploded side view of the invention showing a tubular member with its mounting bracket assembly and a support arm with an attachment assembly for adjustably mounting it to a tubular member.
FIG. 4 is an exploded side view of the invention showing a modified support arm to cross tube attachment assembly.

FIG. 3 shows the means for attaching the cross tube assemblies 2 to the carrier structure 15. This simply consists of screw 5, washer spacer 6, clamp 7 and nut 8. The U-shaped portion of clamp 7 is arranged to surround one of the side bars 15 of carrier 20 and in turn secures the cross tubes 3 by means of the screw 5 and nut 8 in a manner well known in the art. Also shown is the means of rotatably and extensibly connecting the support arm 1 to a cross tube 3. The straight rod portion 1a of a support arm 1 freely inserts through knurled tapered nut 10 and through a tightly fitting plastic ring 9 into cross tube 3. When the internally tapered nut 10 is tightened to the threaded end of the cross tube, the internal taper causes the plastic ring 9 to be compressed tightly against the support arm rod 1, thus effectively locking it in its selected position.

FIG. 4 shows an alternate method of releasably locking the support arm rod 1 to the cross tube 3'. The cross tube is split longitudinally of its threaded portion so that tightening the internally tapered nut will compress the modified cross tube 3' itself against the support arm rod 1. This method does not require the plastic compression ring 9 of FIG. 3.

Figure 5:
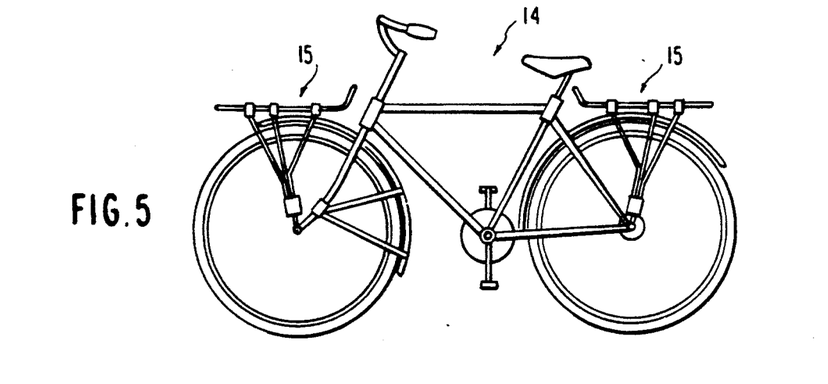
FIG. 5 is a side view of a prior art bicycle carrier mounted on a bicycle such as might be used to practice the principles of this invention.

FIG. 5 is an illustration of one prior art carrier 15 mounted to a bicycle 14 which would be suitable for mounting the carrier attachments 2 including cross tubes 3 or 3' and support arms 1 of this invention.

Figures 6, 7, 8, 9:
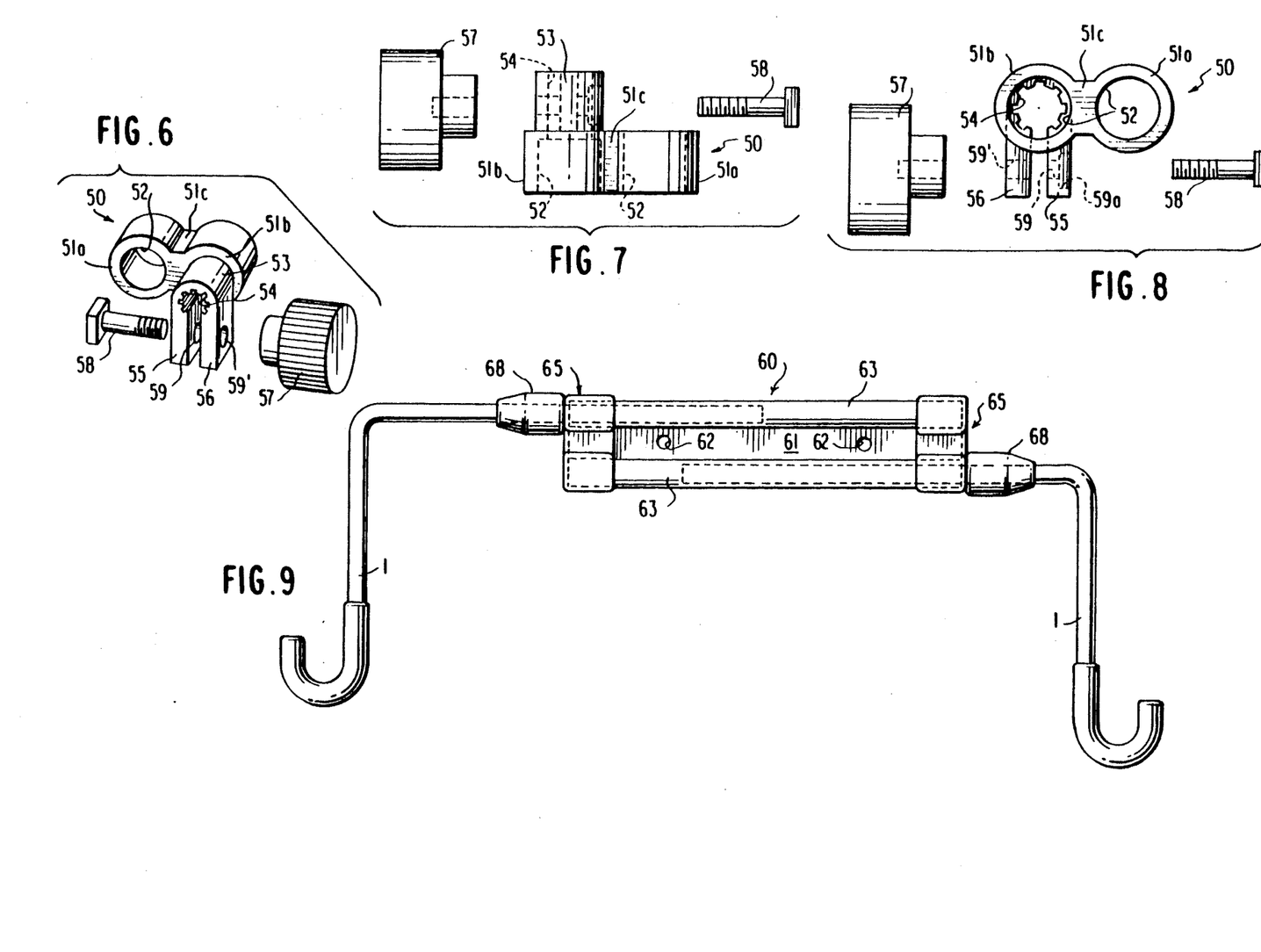
FIG. 6 is a perspective view of an end locking member in accordance with the present invention adapted to receive the ends of a pair of tubular members and adapted to clampingly hold a support arm in its selected position.
FIG. 7 is a top plan view of the end member of FIG. 6.
FIG. 8 is an end elevational view of the end member of FIGS. 6 and 7.
FIG. 9 is a top plan view of a further modified embodiment of a load carrier attachment in accordance with the present invention.
Figure 10:
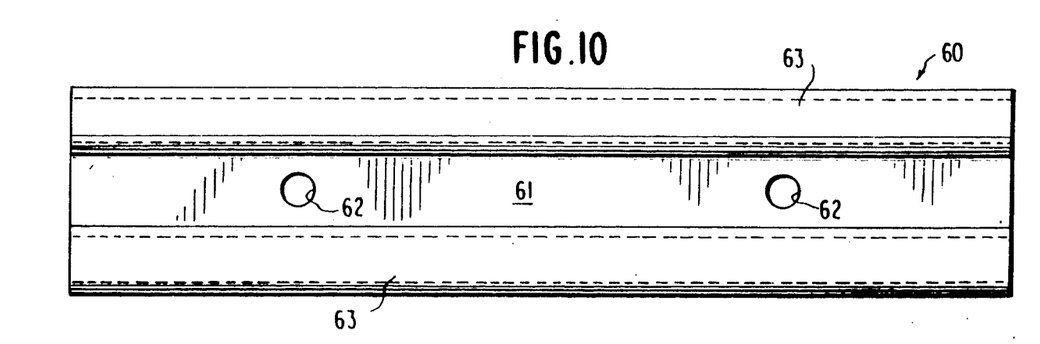
FIG. 10 is a top plan view on an extruded unitary structure incorporating a pair of tubular members for use in the carrier attachment in accordance with the present invention as shown in FIG. 9.
Figure 11:
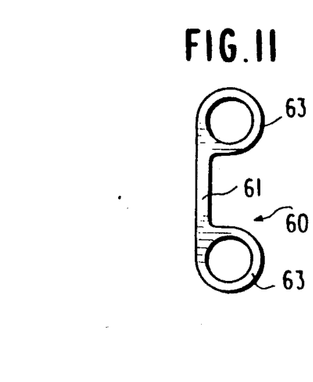
FIG. 11 is a side elevational view of the extruded unitary structure of FIG. 10.
Figure 12:
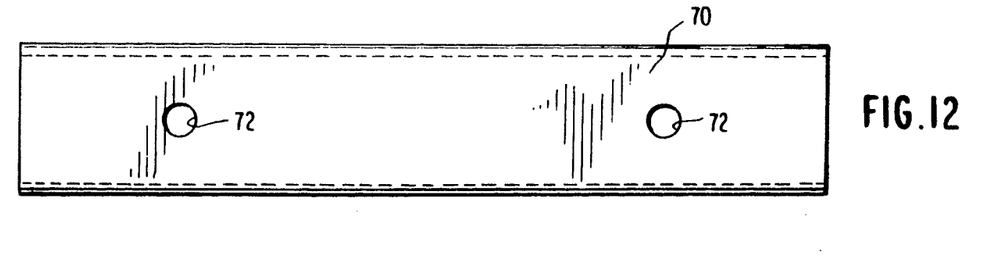
FIG. 12 is a plan view on a plate member for attaching the unitary structure of FIGS. 10 and 11 onto the longitudinal bars of a conventional carrier rack.
Figure 13:
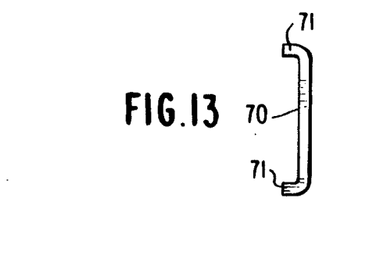
FIG. 13 is a side elevational view of the plate member of FIG. 12.
Figure 14:
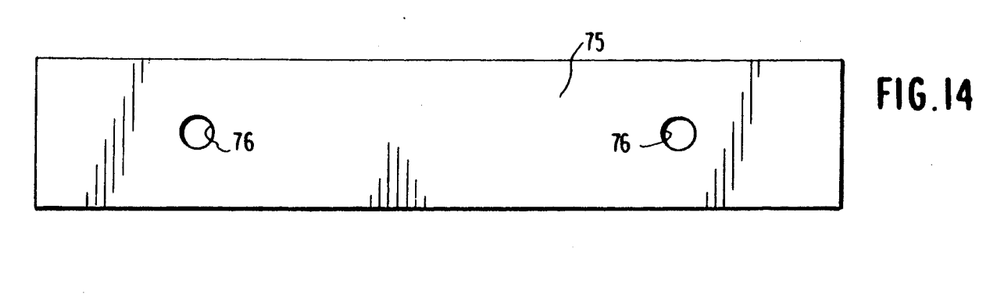
FIG. 14 is a top plan view on an insert plate member for use in installing the carrier attachment of the present invention as shown in FIGS. 9-13 to a conventional rack.
Figure 15:
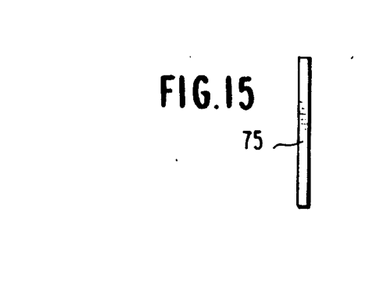
FIG. 15 is a side elevational view of FIG. 14.
Figure 16:
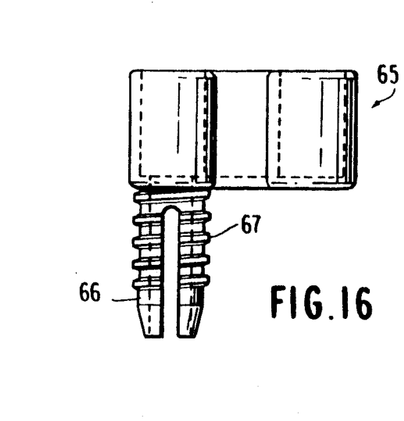
FIG. 16 is a top plan view on the locking end member for use in the embodiment of FIG. 9.
Figure 17:
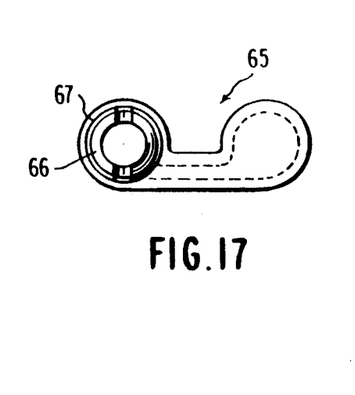
FIG. 17 is an end elevational view of FIG. 16.
Figure 18:
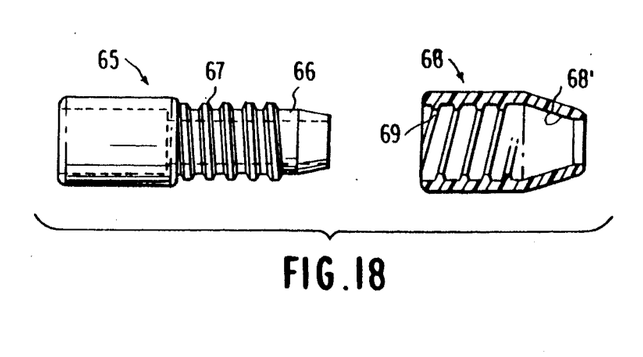
FIG. 18 is a side elevational view of FIG. 17 with a showing of a tapered lock nut.

FIGS. 6 through 8 illustrate an end member generally designated by reference numeral 50 for holding the cross tubes 3 in predetermined, preferably parallel spaced relationship to one another without the use of any welded joints and for locking a support arm in the selected position. The end member 50 which is preferably made from suitable plastic material includes two annular portions 51a and 51b rigidly interconnected by bridging portion 51c. The annular portions 51a and 51b form bores 52 of a size complementary to and snugly fitting over the cross tubes 3 which, in this embodiment, do not require any tapered threads at their ends. The cross tubes 3 are thereby securely fastened within the bores 52, for example, by the use of any well known adhesive, such as Loktite or epoxy resins. An extension 53 for receiving and locking a support arm is formed integrally with the annular member 51b. In addition to a preferably grooved or fluted internal bore 54 of a size adapted to receive the support arm 1, the extension 53 is provided with two leg portions 55 and 56 spaced from one another with a gap therebetween and adapted to lock the support arm 1 in predetermined position by the use of the bolt or screw 58 cooperating with a wing or knurled nut 57. Holes 59 and 59' are provided in legs 55 and 56 whereby hole 59 is preferably provided with a square countersunk configuration 59a to receive the square end of bolt or screw 58 to prevent rotation of the bolt or screw 58.

As mentioned above, the use of the end parts 50 eliminates the need for welding the cross tubes 3 together as at 4 in the embodiment of FIG. 2 and also obviates the need for the threads which otherwise have to be cut into the ends of the cross tubes. As to the rest, the assembly consisting of two end members 50, of cross tubes 3 and of support arms 1 can be secured to the longitudinal members 15 of the carrier rack 20 by the use of clamps as shown in FIG. 3 or by means as described more fully hereinafter in connection with some of the other embodiments.

FIGS. 9 through 18 illustrate a modified embodiment in accordance with the present invention in which the two cross tubes 63 are formed as an integral part of a unitary structure generally designated by reference numeral 60 which may be made, for example, as an extruded light alloy part. The unitary structure 60 includes annular portions 63 forming the cross tubes as well as a flat bridging portion 61 provided with holes 62 for purposes of receiving securing screws (not shown). To clamp the support arms 1 in their selected position (FIG. 9), two end members generally designated by reference numeral 65 and preferably made as injection-molded plastic parts are mounted over the free ends of the extruded structure 60 and, for that purpose, have a cross-sectional configuration complementary to that of the structure 60 (FIG. 17) so that each unitary structure 60 is received within the complementary internal configuration of the corresponding end member 65. The end member 65 is thereby again fastened to the extruded structure 60 by any known means, for example, by the use of any conventional adhesive as pointed out in connection with the embodiment of FIGS. 6 through 8. Additionally, formed integral with the each end member 65 is one split tapered extension 66 with a threaded portion 67 molded into the same and of such internal configuration as to receive a corresponding support arm 1. A lock-nut 68 having an internal threaded portion 69 and terminating in a tapered portion 68' cooperates with the split extension 67 so as to compress the split section over the support arm 1 when the nut 68 is tightened and thereby holds the support arm in the desired position. A fastening plate member 70 (FIG. 12) which may be made, for example, of steel and has the bent-up edges 71 (FIG. 13) cooperates with the extruded structure 60 by means of fastening screws (not shown) extending through holes 62 and engaging in threaded holes 72 in a manner similar to the embodiment illustrated in FIG. 19. For that purpose, the fastening plate member 70 is provided with threaded holes 72 which are spaced in alignment with the holes 62. A rubber insert member 75 (FIGS. 14 and 15) provided with similarly aligned holes 76, which may also be made of two separate insert parts as will be described by reference to FIG. 19, is inserted between the steel plate member 70 and the longitudinal bars 15 of the existing carrier rack so as to prevent metal-to-metal contact.

Figure 19:
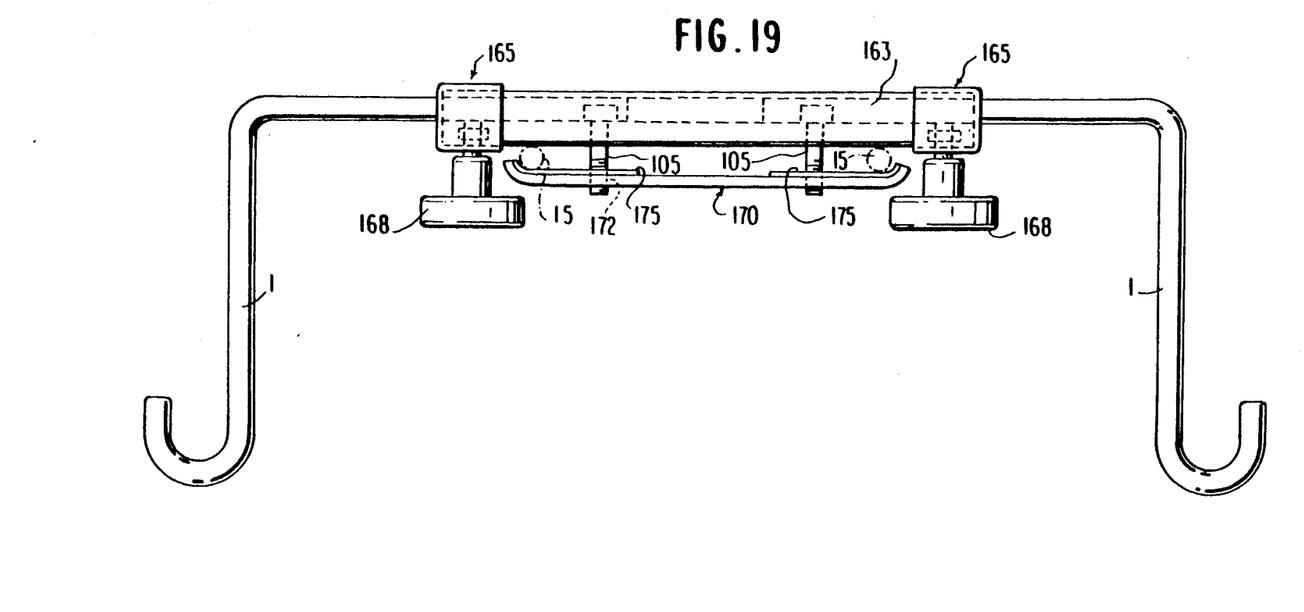
FIG. 19 is an end elevational view of a still further embodiment of a carrier attachment in accordance with the present invention illustrating the support arms in their down position.
Figure 20:
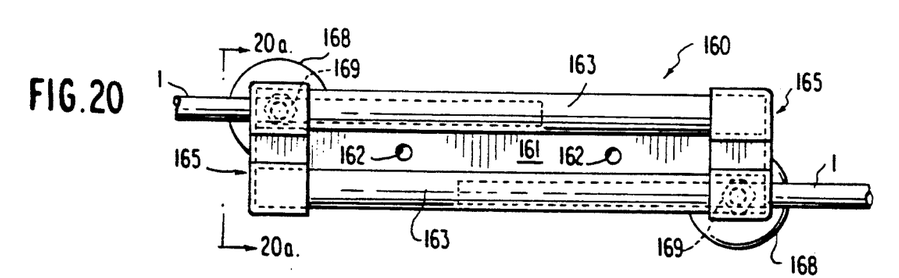
FIG. 20 is a partial top plan view of the embodiment of FIG. 19.
Figure 20A:
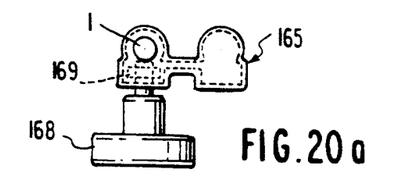
FIG. 20a is a cross-sectional view taken along line 20a—20a of FIG. 20.
Figure 21:
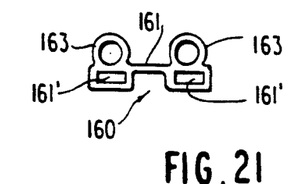
FIG. 21 is a side elevational view, similar to FIG. 1, of the extruded unitary structure with a pair of tubular members as used in the embodiment of FIG. 19.

FIGS. 19 through 21 illustrate a modified embodiment of a carrier attachment in which parts similar to those of the embodiment of FIGS. 9 through 18 are designated by similar reference numerals of the 100 series. As can be seen from FIG. 20, the assembly of unitary structure 160, 163, 161 and 162 and of end members 165 is affixed to the longitudinal bars 1 of the existing rack by the use of fastening screws or bolts 105 extending through holes 162 in the bridging portion 161 of the extruded part 160 and engaging with threaded holes 172 in the fastening plate member 170. The insulation members 175 which in the embodiment of FIG. 19 are made of two separate pieces are placed between the fastening plate 170 and the longitudinal bars 15. Of course, in lieu of providing threaded bores 172 in the fastening plate 170, unthreaded holes may also be provided so that the fastening bolts or screws 105 then cooperate with conventional nuts.

The embodiment of FIGS. 19-21 basically differs from the embodiment of FIGS. 9-18 by the elimination of the split threaded extension 65 of FIG. 9 and in lieu thereof, by the use of a knurled fastening member 168 whose threaded shank cooperates with a square nut 169 or the like held in place in the open cavities 161' formed in the extruded part 160 (FIG. 21). This eliminates the need for machined or molded threaded parts and tapering nuts and utilizes instead conventional machine parts.

In lieu of the bent-up fastening plate members 70 and 170, also flat plate members may be used or plate members having the configuration of the clamping parts 7 shown in FIG. 3. For purposes of adjustability, the plate member 170 may be made of two parts telescopically connected so as to adjust the overall length thereof to the width of the existing rack.

Figures 22, 23:
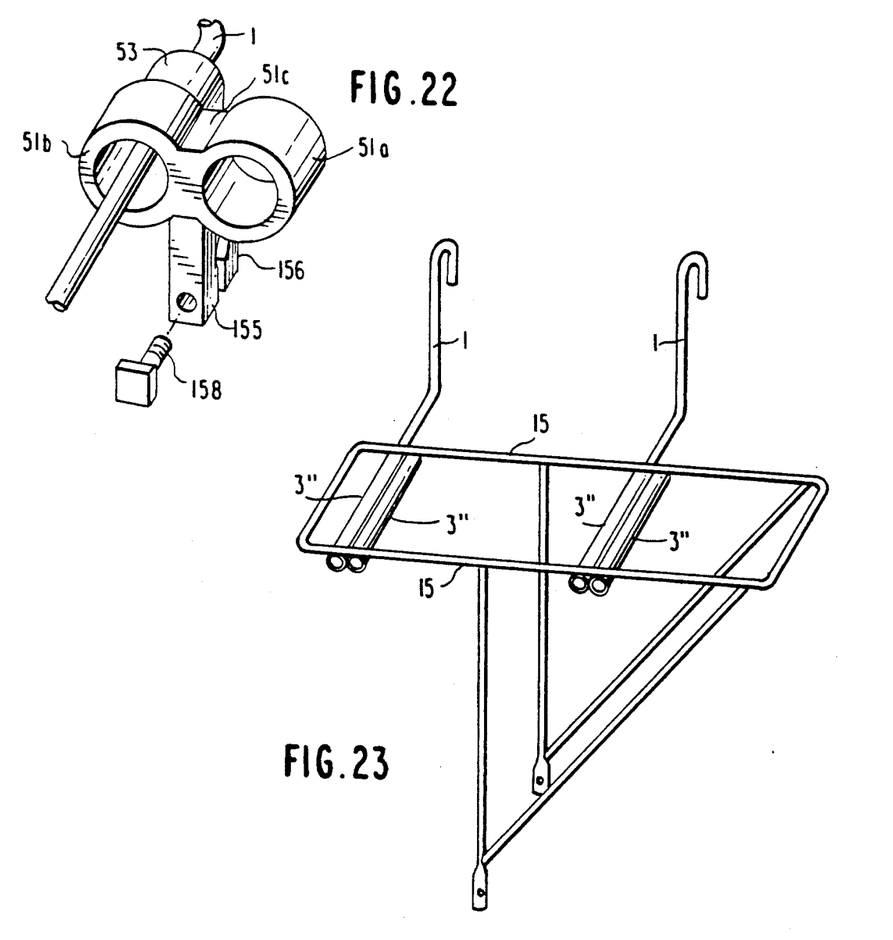
FIG. 22 is a perspective view showing a modified embodiment of the end locking member of FIG. 6 for direct attachment to a longitudinal bar of an existing carrier rack.
FIG. 23 is a perspective view of a modified embodiment in accordance with the present invention in which the principles of the attachment of this invention are directly incorporated into a typical prior art carrier rack.

FIG. 22 illustrates a modified embodiment of the end member 50 illustrated in FIGS. 6 through 8 which differs therefrom only in that two transversely spaced legs 155 and 156 are additionally provided, formed integral with the bridging part 51c which are spaced from one another and form an opening adapted to be clamped together over a longitudinal bar 15 by a conventional wing nut or the like (not shown) cooperating with a square bolt 158 or the like in the manner of the parts 57 and 59 of FIGS. 6-8.

The load carrier attachment in accordance with the present invention may also be incorporated into and/or made integral with the existing carrier as shown in FIG. 23 in which case the cross tubes 3" can be fixedly secured to the longitudinal members 15 of the existing rack. This can be done in any suitable manner, for example, by welding. Furthermore, by incorporating the cross tubes 3" into the rack, and permanently attaching the same to the longitudinal bars 15, the usual cross-bracing members of the rack can be eliminated. The cross tubes 3" may be permanently connected with the longitudinal members 15, for example, by welding the same either to the top of or to the bottom of the longitudinal members 15 as shown in FIG. 23. For locking the support arms 1 in desired position, any of the locking devices described hereinabove may be utilized. Additionally, the cross tubes 3" may also be incorporated into the rack flush with the frame thereof and permanently built into the frame.

From the foregoing description, one skilled in the art can easily ascertain the essential characteristics of this invention, and without departing from the spirit and scope thereof, can make various changes and modifications of the invention to adapt it to various usages and conditions. The various arrangements of the different embodiments may also be readily interchanged with one another within the purview of the present invention. I therefore do not wish to be limited to the details shown and described herein but intend to cover all such changes and modifications as are encompassed by the scope of the appended claims.

I claim:

1. An adjustable load carrier attachment adapted to be attached to a load carrier means forming a load-supporting surface and having a generally longitudinal direction, comprising at least one pair of tubular members open at least at one end and extending generally transversely to the longitudinal direction, the tubular members of a respective pair being spaced from one another in the longitudinal direction in predetermined relationship, said tubular members being adapted to be secured to said load carrier means so as to be located in a plane substantially parallel to the plane of the load-supporting surface, and means for adjustably changing the load-supporting configuration of the load carrier attachment including one support arm for each of the tubular members of a respective pair of tubular members, each support arm being telescopically associated with a respective one of the pair of tubular members so as to be axially extensible and coaxially rotatable with respect thereto, the support arms associated with a respective pair of tubular members extending in opposite directions from the open ends of the pair of tubular members, and locking means for securing each support arm relative to its corresponding tubular member against axial and rotatable movement.

2. An adjustable load carrier attachment according to claim 1, wherein the pair of tubular members and their corresponding support arms extend in a direction generally transverse to the longitudinal direction of the load carrier means.

3. An adjustable load carrier attachment according to claim 2, which includes two such pairs of tubular members each having two support arms with the support arms of a pair extending in opposite directions.

4. The attachment of claim 3, wherein four support arms are provided, each being generally L-shaped so that angular displacement thereof enables the portion of each L remote from the tubular members to provide either side or base support for a load.

5. The attachment of claim 4, wherein the remote portion of each L additionally includes an approximately U-shaped hook portion.

6. The attachment of claim 4, wherein said support arms may be rotated and locked to any position within a 360 degree range.

7. The attachment of claim 1, wherein said locking means includes releasable locking means are provided for releasably locking said support arms in any given angularly displaced and extended position.

8. An adjustable load-carrying attachment according to claim 1, wherein the support arms are generally L-shaped with a generally U-shaped hook portion at the free end thereof.

9. An attachment according to claim 1, wherein the tubular members are fixedly held at predetermined distance relative to one another by end members provided with annular openings of internal dimensions complementary to the external dimensions of the tubular members and fitted over the two ends of a pair of tubular members.

10. An attachment according to claim 9, wherein the tubular members are secured to the end members by adhesive means.

11. An attachment according to claim 10, wherein the end members are made of plastic material.

12. An attachment according to claim 9, wherein the end members include extension means formed integrally therewith to slidingly receive therein a respective support arm in telescoping coaxial relationship with respect to a corresponding tubular member, and means holding the respective support arm in its selected position within the extension means.

13. An attachment according to claim 12, wherein a respective extension means is provided with a split threaded portion terminating in a tapered end section and adapted to cooperate with a tapered nut so as to clamp the extension means over the corresponding support arm.

14. An attachment according to claim 12, wherein the extension means includes two leg portions spaced from one another and defining therebetween an opening for receiving a respective support arm in coaxial relationship with a respective tubular member, and threaded means cooperating with said leg portions to draw the same together so as to clampingly hold fast the respective support arm.

15. An attachment according to claim 14, further comprising clamping means formed integrally with a respective end member for detachably clamping a respective end member to a part of the load carrier means.

16. An attachment according to claim 1, wherein the tubular members form part of a unitary structure in which the tubular members are joined by an integral bridging portion.

17. An attachment according to claim 16, further comprising means for securing the attachment to generally longitudinal frame members of the load carrier means including a plate member and threaded means extending through the bridging portion to clampingly hold fast the longitudinal frame members of the load carrier means between said bridging portion and the plate members.

18. An attachment according to claim 16, further comprising end members having a cross section complementary to the cross section of the unitary structure so as to enable the end members to slidingly fit over the integral structure.

19. A load-carrying attachment for a bicycle rack which has a predetermined width and length and which permits a change in the load-carrying configuration, comprising two pairs of tubular members extending generally transversely to the length direction, one substantially L-shaped tubular support arm telescopically associated with a corresponding tubular member to enable axial movement of the support arm relative to the associated tubular member, said support arms being of a cross section substantially complementary to the cross section of the tubular members to enable relative coaxial angular displacement, locking means for locking each support arm in its selected position relative to its associated tubular member, and attaching means to enable attachment of the load-carrying attachment to the bicycle rack in such a manner that the tubular members are located with in the area defined by the length and width of the rack and the tubular members of a pair of tubular members are spaced from each other in the length direction.

20. A load-carrying attachment according to claim 19, wherein the support arms associated with a pair of tubular members extend in opposite directions from a respective end of the pair of tubular members, and wherein the tubular members of a respective pair of tubular members are fixed with respect to one another.

21. A load-carrying attachment according to claim 19, wherein each support arm includes at its free outer end a generally U-shaped hook portion, and wherein an L-shaped support arm and its hook portion are substantially coplanar.

22. A bicycle carrier for a bicycle having a generally longitudinal direction, comprising frame means consisting of several frame members defining the width and length of the carrier and including two pairs of tubular members extending generally transversely to the longitudinal bicycle direction, said tubular members being secured to other frame members of the frame means and having a length at least equal to the width dimension defined by said other frame members, one generally L-shaped support arm telescopically associated with a respective tubular member in such a manner as to enable relative axial movement and angular displacement between a respective support arm and its associated tubular member, said support arms extending in opposite directions from the ends of a respective pair of tubular members, and means for holding the support arms in their selected axial and angular positions relative to the tubular members.

23. A bicycle carrier according to claim 22, wherein said tubular members are secured to said other frame members by detachable clamping means enabling adjustment of the tubular members on said other frame members in the longitudinal direction of the bicycle carrier.

24. A bicycle carrier according to claim 22, wherein said tubular members are fixedly integrated into other frame members.

25. An adjustable load carrier attachment adapted to be attached to a load carrier means of a given width and having longitudinally extending members, comprising at least one pair of tubular members open at least at one end and extending in predetermined relationship to one another, said tubular members being adapted to be secured to said load carrier means and being of a length at least equal to the width of the load carrier means where the tubular members are secured to the load carrier means, and means for adjustably changing the load-supporting configuration of the load carrier attachment including one support arm for each of the tubular members of a pair of tubular members, each support arm being telescopically associated with a respective one of the pair of tubular members so as to be axially extensible and coaxially rotatable with respect thereto, the support arms associated with a pair of tubular members extending in opposite directions from the free ends of the pair of tubular members, and means for securing each support arm relative to its corresponding tubular member against axial and rotational movement, wherein the pair of tubular members and their corresponding support arms extend in a direction generally transverse to the direction of the longitudinally extending members of the load carrier means, and wherein said tubular members are adapted to be connected to said load carrier means by connecting means in such a manner that the tubular members are spaced from each other in the longitudinal direction of the longitudinally extending members and in a plane substantially parallel to the plane containing the longitudinally extending members.

26. An adjustable load carrier attachment according to claim 25, which includes two such pairs of tubular members each having two support arms with the support arms of a pair extending in opposite directions.

27. The attachment of claim 26, wherein each support arm is generally L-shaped so that angular displacement thereof enables the remote portion of each L to provide either side or base support for a load.

28. The attachment of claim 27, wherein the remote portion of each L additionally includes an approximately U-shaped hook portion.

29. A bicycle carrier comprising frame means including several frame members defining width and length of the frame means, two pairs of tubular members open at least at one end and extending generally transversely to the length direction of the frame means, means securing said tubular members to other frame members of the frame means in such a manner that the tubular members of each pair are spaced from one another a predetermined distance in the length direction of the frame means and in a plane substantially parallel to the plane defined by the other frame members to which they are secured, one generally L-shaped support arm telescopically associated with a respective tubular member in such a manner as to enable relative axial and coaxial angular displacement between a respective support arm and its associated tubular member, said support arms extending in opposite directions from the free ends of a respective pair of tubular members, and means for holding the support arms in their selected axial and angular positions relative to the tubular members.

30. A bicycle carrier according to claim 29, wherein said tubular members are secured directly to said same frame members by detachable clamping means enabling adjustment of the tubular members on said last-mentioned frame members in the length direction.

31. A bicycle carrier according to claim 29, wherein said tubular members rest directly on said other frame members.

32. An adjustable load carrier attachment adapted to be attached to a load carrier means of a given width, comprising at least one pair of tubular members open at least at one end and extending in predetermined relationship to one another, said tubular members being adapted to be secured to said load carrier means and being of a length at least equal to the width of the load carrier means where the tubular members are secured to the load carrier means, and means for adjustably changing the load-supporting configuration of the load carrier attachment including one support arm for each of the tubular members of a pair of tubular members, each support arm being telescopically associated with a respective one of the pair of tubular members so as to be axially extensible and coaxially rotatable with respect thereto, the support arms associated with a pair of tubular members extending in opposite directions from the free end of the pair of tubular members, means for securing each support arm relative to its corresponding tubular member against axial and rotational movement, and means for securing the tubular members to the load carrier means in such a manner that the tubular members are located within an area defined by the length of the frame means and directly above said area.

33. An adjustable load carrier attachment for a load carrier means having a load-supporting surface defined by frame members according to claim 32, further comprising means for securing said tubular members to the load carrier means in such a manner that the tubular members rest directly on some of said frame members.

34. An adjustable load carrier attachment adapted to be attached to a load carrier means of a given width and having a load-support surface defined by frame members, comprising at least one pair of tubular members open at least at one end and extending in predetermined relationship to one another, said tubular members being adapted to be secured to said load carrier means and being of a length at least equal to the width of the load carrier means where the tubular members are secured to the load carrier means, and means for adjustably changing the load-supporting configuration of the load carrier attachment including one support arm for each of the tubular members of a pair of tubular members, each support arm being telescopically associated with a respective one of the pair of tubular members so as to be axially extensible and coaxially rotatable with respect thereto, the support arms associated with a pair of tubular members extending in opposite directions from the free ends of the pair of tubular members, means for securing each support arm relatively to its corresponding tubular member against axial and rotational movement, and means for securing said tubular members to the load carrier means in such a manner that the tubular members rest directly on said frame members.

* * * * *